(12) United States Patent
Dods et al.

(10) Patent No.: US 12,047,410 B2
(45) Date of Patent: Jul. 23, 2024

(54) SYSTEMS AND METHODS FOR AVOIDING OFFLOADING TRAFFIC FLOWS ASSOCIATED WITH MALICIOUS DATA

(71) Applicant: Juniper Networks, Inc., Sunnyvale, CA (US)

(72) Inventors: Craig Dods, Stittsville (CA); Pavan Lakshmi Kumar Jonnadula, Banglore (IN); Nikhil Gavraskar, Bangalore (IN); Anurag Raghuvanshi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 248 days.

(21) Appl. No.: 17/651,510

(22) Filed: Feb. 17, 2022

(65) Prior Publication Data

US 2023/0199024 A1    Jun. 22, 2023

(30) Foreign Application Priority Data

Dec. 22, 2021    (IN) .............................. 202141059961

(51) Int. Cl.
    *H04L 9/40*    (2022.01)
(52) U.S. Cl.
    CPC ...... *H04L 63/1475* (2013.01); *H04L 63/1425* (2013.01); *H04L 63/20* (2013.01)

(58) Field of Classification Search
    CPC . H04L 63/1475; H04L 63/1425; H04L 63/20; H04L 63/1408; H04L 63/1416
    See application file for complete search history.

(56) References Cited

U.S. PATENT DOCUMENTS

| | | | |
|---|---|---|---|
| 8,335,857 B1 * | 12/2012 | Rai ........................ | H04L 43/16 370/230 |
| 2014/0259140 A1 | 9/2014 | Subramanian | |
| 2015/0188933 A1 | 7/2015 | Zeitlin et al. | |
| 2015/0256431 A1 | 9/2015 | Buchanan et al. | |
| 2020/0007427 A1 * | 1/2020 | Kumar T V .......... | H04L 67/142 |
| 2020/0120408 A1 | 4/2020 | Boyd et al. | |
| 2021/0019403 A1 * | 1/2021 | Mehta .................... | G06N 3/045 |
| 2021/0329459 A1 * | 10/2021 | Kaushik .................. | H04L 63/20 |

OTHER PUBLICATIONS

Extended European Search Report for Application No. EP22165106.0, mailed on Sep. 19, 2022, 7 pages.

* cited by examiner

*Primary Examiner* — Mohammad W Reza
(74) *Attorney, Agent, or Firm* — Harrity & Harrity, LLP (57) ABSTRACT

In some implementations, a security device may receive a traffic flow. The security device may determine an amount of a padding included in the traffic flow. The security device may determine whether the amount of the padding included in the traffic flow satisfies a padding threshold. The security device may perform, based on the amount of the padding satisfying the padding threshold, offloading for the traffic flow. The security device may inspect, based on the amount of the padding failing to satisfy the padding threshold, an entire portion of the traffic flow.

20 Claims, 9 Drawing Sheets

SYSTEMS AND METHODS FOR AVOIDING OFFLOADING TRAFFIC FLOWS ASSOCIATED WITH MALICIOUS DATA

CROSS-REFERENCE TO RELATED APPLICATION

This application claims priority to Indian Provisional Application No. 202141059961 entitled "SYSTEMS AND METHODS FOR AVOIDING OFFLOADING TRAFFIC FLOWS ASSOCIATED WITH MALICIOUS DATA," filed on Dec. 22, 2021. The entire content of which is expressly incorporated herein by reference.

BACKGROUND

Firewalls, intrusion detection systems, and intrusion prevention systems may be used to protect a computer network from unauthorized or disruptive users. A firewall can be used to secure a local area network from users outside the local area network. A firewall may check, route, and label messages sent to or from users outside the local area network. An intrusion detection system (IDS) can be used to examine information being communicated within a network to recognize suspicious patterns of behavior. An intrusion prevention system (IPS) is an in-line version of an IDS. An IPS can be used to examine information as the information is being communicated within a network to recognize suspicious patterns of behavior. Information obtained by the IDS or the IPS can be used to block unauthorized or disruptive users from accessing the network.

SUMMARY

Some implementations described herein relate to a method. The method may include receiving, by a security device, a traffic flow. The method may include determining, by the security device, an amount of a padding included in the traffic flow. The method may include determining, by the security device, whether the amount of the padding included in the traffic flow satisfies a padding threshold. The method may include performing, by the security device and based on the amount of the padding satisfying the padding threshold, offloading for the traffic flow. The method may include inspecting, by the security device and based on the amount of the padding failing to satisfy the padding threshold, an entire portion of the traffic flow.

Some implementations described herein relate to a non-transitory computer-readable medium that stores a set of instructions for a security device. The set of instructions, when executed by one or more processors of the security device, may cause the security device to receive a traffic flow. The set of instructions, when executed by one or more processors of the security device, may cause the security device to determine an amount of a padding included in the traffic flow. The set of instructions, when executed by one or more processors of the security device, may cause the security device to determine whether the amount of the padding included in the traffic flow satisfies a padding threshold. The set of instructions, when executed by one or more processors of the security device, may cause the security device to perform, based on the amount of the padding satisfying the padding threshold, offloading for the traffic flow. The set of instructions, when executed by one or more processors of the security device, may cause the security device to inspect, based on the amount of the padding failing to satisfy the padding threshold, an entire portion of the traffic flow.

Some implementations described herein relate to a security device. The security device may include one or more memories and one or more processors. The one or more processors may be configured to receive a traffic flow. The one or more processors may be configured to determine an amount of a padding included in the traffic flow. The one or more processors may be configured to determine whether the amount of the padding included in the traffic flow satisfies a padding threshold. The one or more processors may be configured to perform, based on the amount of the padding satisfying the padding threshold, offloading for the traffic flow. The one or more processors may be configured to inspect, based on the amount of the padding failing to satisfy the padding threshold, an entire portion of the traffic flow.

DETAILED DESCRIPTION

The following detailed description of example implementations refers to the accompanying drawings. The same reference numbers in different drawings may identify the same or similar elements.

A security device (e.g., a firewall device, an intrusion detection system (ID S), or an intrusion prevention system (IPS), among other examples) may be configured to provide a security service (e.g., a next-generation firewall service, a unified threat management service, or an advanced threat protection service, among other examples). The security service may inspect traffic (e.g., using a deep packet inspection (DPI) technique). The security device may determine, based on inspecting the traffic, a rule set (e.g., a security policy) for processing the traffic in accordance with the security service.

A firewall may be used to secure a network from users outside the network. A firewall may monitor traffic (e.g., to and from device outside of the network), perform one or more firewall actions on the traffic, or apply one or more other security actions to prevent malicious traffic, confidential information, or unauthorized users, among other examples, from entering or exiting the network.

An IDS may be used to examine information being communicated within a network to recognize suspicious patterns of behavior. An IPS may be used to examine information as the information is being communicated within a network to recognize suspicious patterns of behavior. Information obtained by the IDS and/or the IPS may be used to block unauthorized or disruptive users and/or devices associated with the suspicious patterns of behavior from accessing the network.

As the number of users and/or the amount of traffic increases, the computing resources (e.g., processing resources, memory resources, and/or communication resources, among other examples) utilized by a security device to provide a security service may also increase. To reduce the amount of computing resources utilized by the security device to provide the security service, the security device may be configured to perform offloading. When performing offloading, the security device may process a portion of the data included in a traffic flow. If the security device determines that the portion of the data does not include malicious data (e.g., data that is to be prevented from entering or exiting the network or data indicating a suspicious pattern of behavior, among other examples) based on processing the portion of the data, the security device may allow a remaining portion of the traffic flow to pass uninspected.

For example, for a particular traffic flow, a security device may be configured to stop processing a remaining portion of data included in a traffic flow based on processing an initial portion of data (e.g., 200 kilobytes (KB), 250 KB, 500 KB, or 1 gigabyte (GB) of data, among other examples) and determining that the initial portion of data does not include malicious data. However, failing to inspect the remaining portion of the traffic flow may create a bypass condition that enables a malicious or unauthorized user to access a protected network or device.

For example, a malicious user may transmit enough data to the security device to cause the security device to stop inspecting the traffic flow prior to the traffic flow including malicious data (e.g., data for attacking the network and/or a device included in the network). As an example, the malicious actor may insert padding (e.g., a set of repeated characters) into a traffic flow until the padding is greater than, or equal to, the maximum amount of data inspected by the security device until the security device determines that a remaining portion of the traffic flow is not to be inspected. The malicious data may be included in a remaining portion of the traffic flow following the padding. Because the maximum amount of data inspected by the security device has been reached, the security device may not inspect the portion of the traffic flow that includes the malicious data thereby allowing the malicious data to enter the network and/or be transmitted to a device included in the network.

Some implementations described herein enable a security device to modify a set of conditions associated with performing offloading based on an amount of padding included in a traffic flow. In some implementations, the security device may determine an amount of padding included in a traffic flow. The security device may determine whether the amount of padding satisfies (e.g., is less than) a threshold amount of padding. The security device may perform offloading for the traffic flow when the amount of padding satisfies the threshold amount of padding. The security device may not perform offloading (e.g., the security device may inspect every packet included in the traffic flow) when the amount of padding fails to satisfy (e.g., is greater than) the threshold amount of padding. In this way, the security device may prevent a malicious user from inserting enough padding into a traffic flow to cause the security device to stop inspecting the traffic flow prior to inspecting a portion of the traffic flow including malicious data.

FIGS. 1A-1F are diagrams of an example implementation 100 associated with avoiding offloading traffic flows containing malicious data. As shown in FIGS. 1A-1F, example implementation 100 includes a security device 105 and a user device 110. These devices are described in more detail below in connection with FIG. 2 and FIG. 3.

Figure 1A:
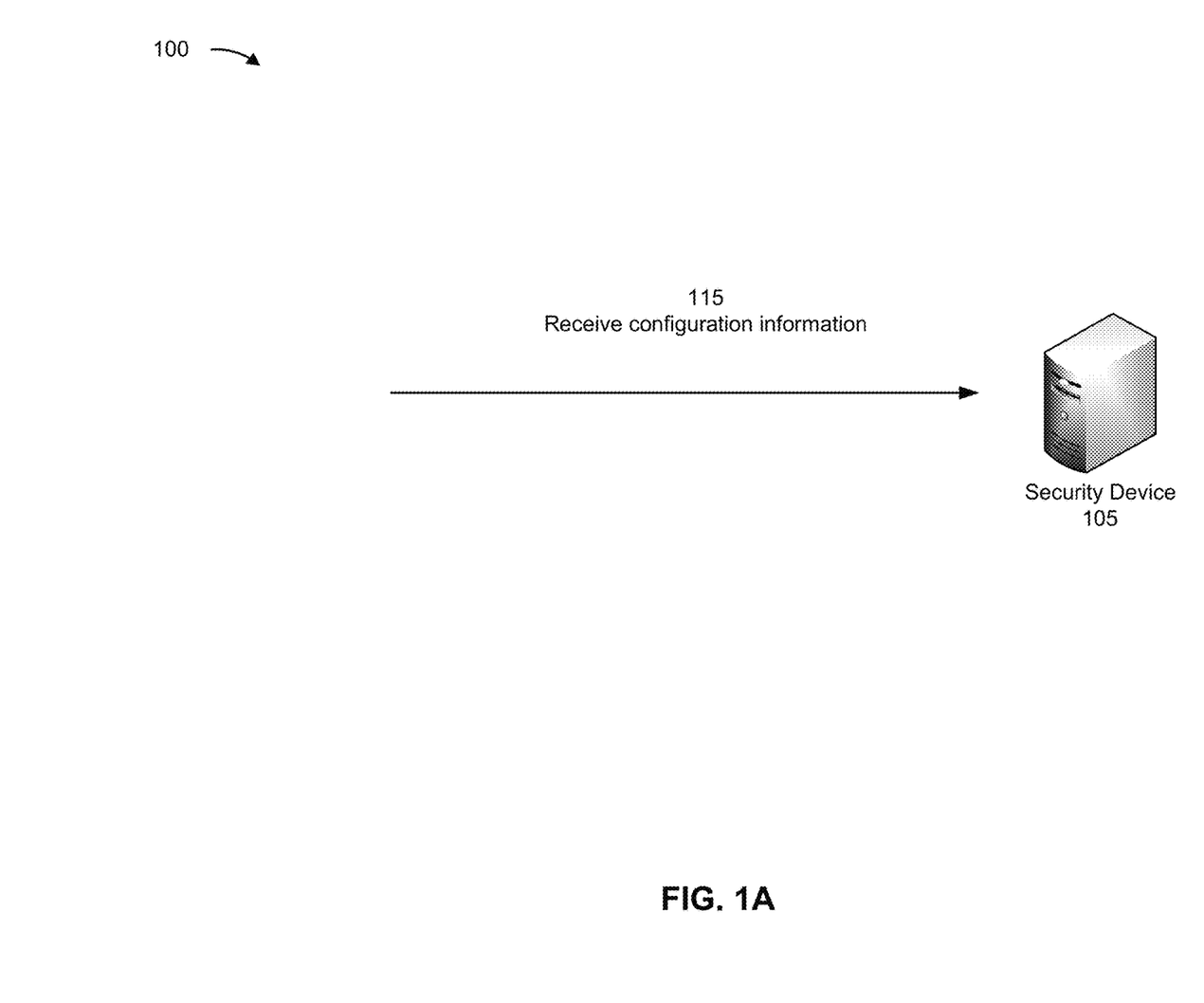
FIGS. 1A-1F are diagrams of an example implementation described herein.

As shown in FIG. 1A, and by reference number 115, the security device 105 may receive configuration information. In some implementations, the configuration information may include information associated with determining whether to perform offloading for a traffic flow. For example, as described in greater detail below, the configuration information may include information indicating a size and/or a byte-length of an initial portion of the traffic flow, a padding threshold, and/or a data threshold, among other examples.

Figure 1B:
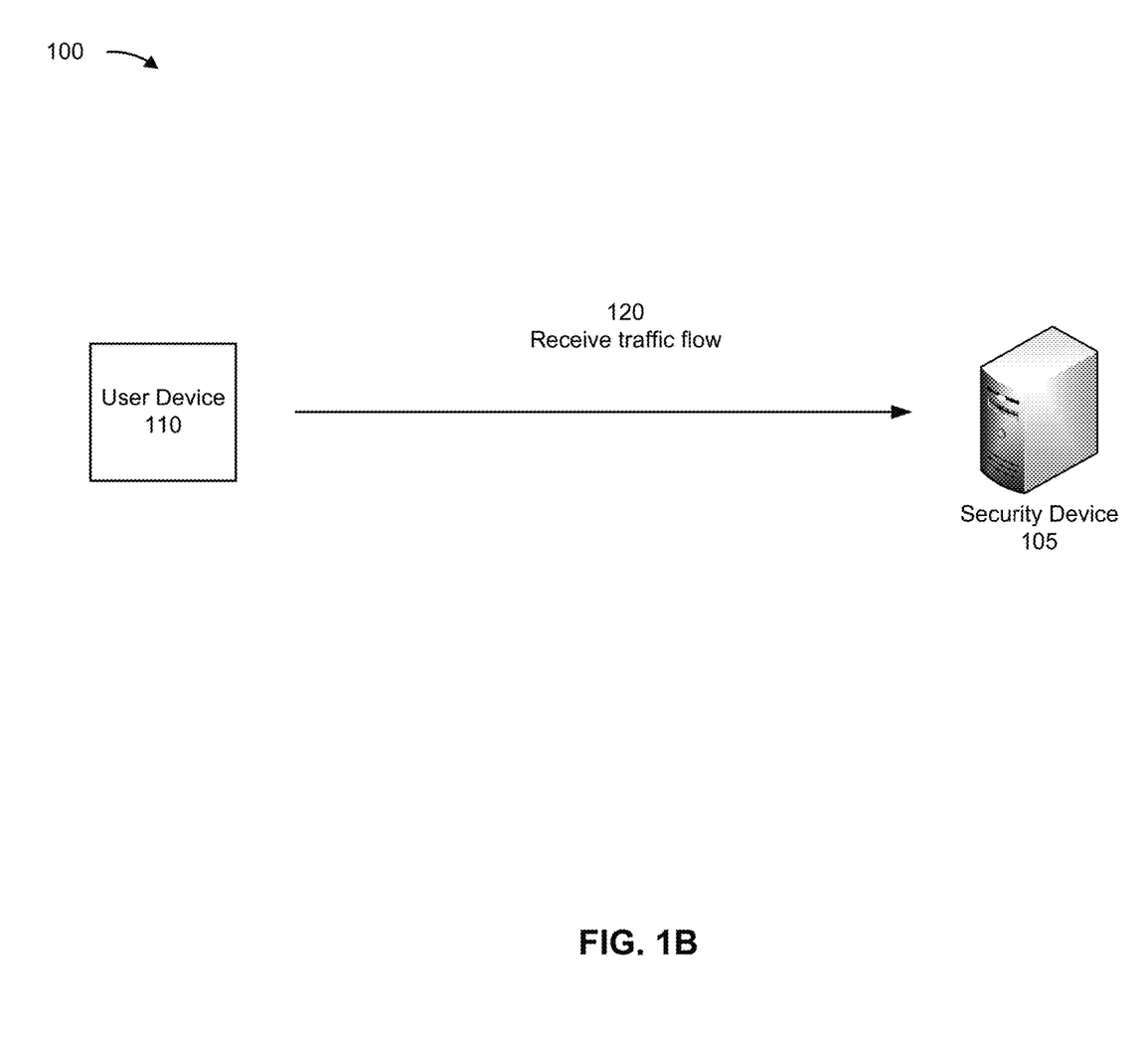

As shown in FIG. 1B, and by reference number 120, the security device 105 may receive a traffic flow from the user device 110. In some implementations, the traffic flow may be associated with a communication session monitored by the security device 105 and may include one or more data packets being transmitted into or out of a network protected by the security device 105. For example, the security device 105 may include a firewall device that receives a traffic flow being transmitted to or from a device outside of the network protected by the security device 105.

In some implementations, the traffic flow may include one or more data packets being transmitted between devices included in the network protected by the security device 105. For example, the security device 105 may include an IDS and/or and IPS that monitors a traffic flow transmitted between a first device and a second device that are both included in the network protected by the security device 105. The security device 105 may receive the traffic flow based on the IDS and/or the IPS monitoring the traffic transmitted between the first device and the second device.

Figure 1C:
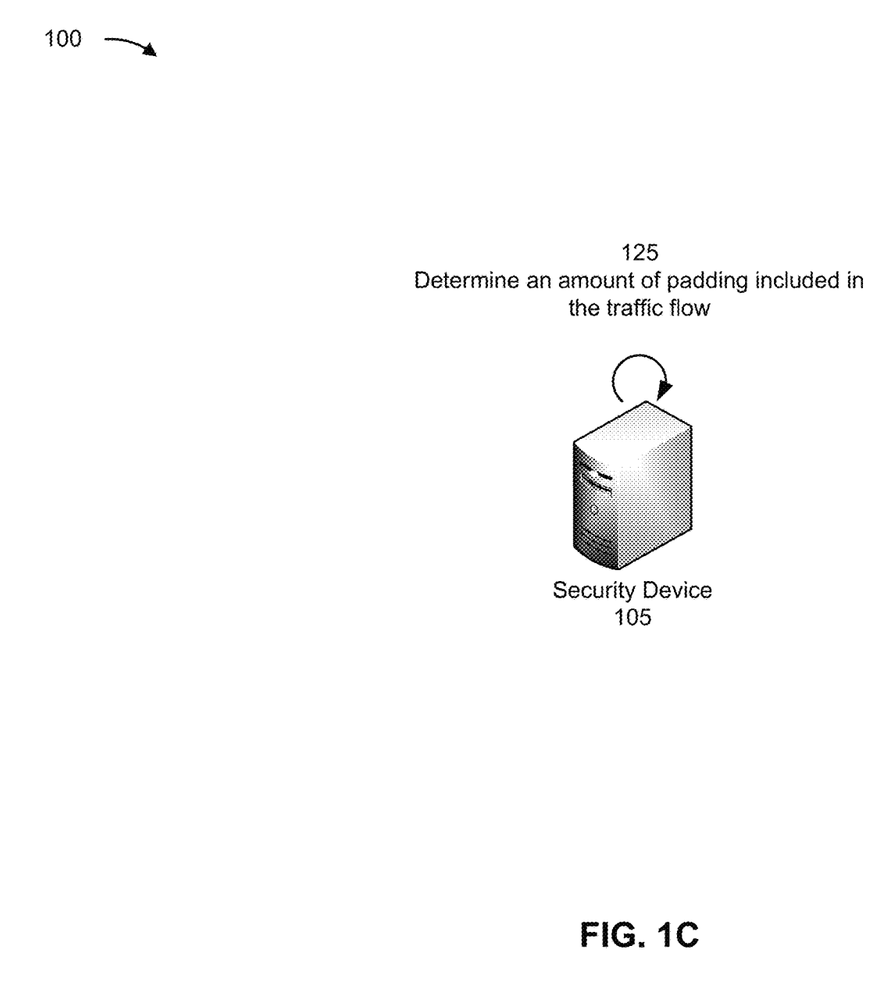

As shown in FIG. 1C, and by reference number 125, the security device 105 may determine an amount of padding included in the traffic flow. The padding may include a set of characters added to modify a size and/or a byte-length of the traffic flow and/or a portion of the traffic flow (e.g., a data packet included in the packet flow). For example, the traffic flow may include a set of repeated and/or sequential characters to cause the traffic flow and/or a portion of the traffic flow to have a size and/or a byte-length required by a communications protocol associated with transmitting the traffic flow or to be larger than a size or byte-length associated with data inspected by the security device 105 when performing offloading as described above.

In some implementations, the security device 105 may analyze the traffic flow and/or the portion of the traffic flow to identify the set of repeated and/or sequential characters. For example, the security device 105 may analyze a data packet included in the traffic flow and/or the portion of the traffic flow to identify a pattern of repeated characters within a payload portion of the data packet. The security device 105 may determine a size and/or a byte-length of the pattern of repeated characters. The security device 105 may determine an amount of padding included in the traffic flow based on the size and/or the byte-length of the pattern of repeated characters.

In some implementations, the security device 105 may determine that the amount of padding included in the traffic flow corresponds to the size and/or the byte-length of the pattern of repeated characters. In some implementations, the security device 105 may determine that the amount of padding included in the traffic flow based on multiplying the size and/or the byte-length of the pattern of repeated characters by a quantity of data packets included in the traffic flow and/or the portion of the traffic flow.

In some implementations, the security device 105 may determine the amount of padding included in the traffic flow based on a communication protocol associated with the traffic flow. For example, the configuration information may indicate that offloading is to be performed for traffic flows associated with one or more protocols and including an amount of padding that satisfies (e.g., is less than) the padding threshold. The security device 105 may determine the amount of padding included in the traffic flow based on the traffic flow being associated with one of the one or more protocols indicated in the configuration information.

In some implementations, the security device 105 may determine the amount of padding included in the traffic flow based on a size or a byte-length of the traffic flow. For example, the configuration information may indicate that offloading is to be performed for traffic flows having a size and/or a byte-length that satisfies (e.g., is greater than) a data threshold, a data packet having a size and/or a byte-length that satisfies a data threshold, and/or another portion of the traffic flow having a size and/or a byte-length that satisfies a data threshold, among other examples.

In some implementations, the security device 105 may determine the size and/or the byte-length of the traffic flow based on a size and/or a byte-length of a data packet included in the traffic flow. In some implementations, the size and/or byte-length of the data packet may not include a size and/or a byte-length of a header portion of the data packet. For example, the security device 105 may determine the size and/or the byte-length of the data packet based on a size and/or a byte-length of a payload portion of the data packet.

In some implementations, the size and/or the byte-length of the payload portion may not include a size and/or a byte-length of any padding included in the data packet. For example, the security device 105 may determine a size and/or a byte-length of any padding included in the payload portion and may subtract the size and/or the byte-length of any padding included in the payload portion of the data packet from the size and/or byte-length of the payload portion.

In some implementations, the security device 105 may subtract the size and/or the byte-length of any padding included in the payload portion of the data packet from the size and/or byte-length of the payload portion based on the size and/or the byte-length of any padding included in the payload portion satisfying a payload padding threshold (e.g., when the size and/or the byte-length is less than 4 KB, 6 KB, or 8 KB, among other examples). The security device 105 may include the size and/or the byte-length of the padding included in the payload portion when the size and/or byte-length of the padding fails to satisfy the payload padding threshold (e.g., when the size and/or the byte-length is greater than 4 KB, 6 KB, or 8 KB, among other examples).

The security device 105 may determine whether the size and/or the byte-length of the traffic flow, the data packet, and/or the portion of the traffic flow satisfies the data threshold. In some implementations, the security device 105 may determine that the size and/or the byte-length of the traffic flow, the data packet, and/or the portion of the traffic flow satisfies the data threshold. The security device 105 may determine the amount of padding included in the traffic flow based on the size and/or the byte-length of size and/or the byte-length of the traffic flow, the data packet, and/or the portion of the traffic flow satisfying the data threshold.

In some implementations, the security device 105 may determine that the size and/or the byte-length of the traffic flow, the data packet, and/or the portion of the traffic flow fails to satisfy the data threshold. The security device 105 may determine that offloading is not to be performed for the traffic flow based on the size and/or the byte-length of the traffic flow, the data packet, and/or the portion of the traffic flow failing to satisfy the data threshold. The security device 105 may not determine the amount of padding included in the traffic flow based on determining that offloading is not to be performed for the traffic flow.

In some implementations, the security device 105 may determine the amount of padding included in the traffic flow based on a security mode associated with the security device 105. The security mode may indicate a set of criteria for determining whether offloading is enabled for a traffic flow. When offloading is enabled for a traffic flow (e.g., when the set of criteria are satisfied), the security device 105 may determine the amount of padding included in the traffic flow to determine whether offloading is to be performed for the traffic flow, as described elsewhere herein. When offloading is not enabled for a traffic flow (e.g., when one or more criteria, of the set of criteria, are not satisfied), the security device 105 may not determine that offloading is not to be performed for the traffic flow. The security device 105 may not determine the amount of padding included in the traffic flow based on offloading not being performed for the traffic flow.

In some implementations, the security mode may be indicated in the configuration information. For example, the configuration information may indicate a first security mode, a second security mode, or a third security mode. In some implementations, the first security mode may be a default security mode. For example, the first security mode may indicate that offloading is enabled for all traffic flows and/or a size and/or a byte-length an initial portion (e.g., 256 KB or 512 KB, among other examples) of a traffic flow that is to be inspected by the security device 105 based on performing offloading for the traffic flow.

In some implementations, the second security mode may be a conservative security mode relative to the first security mode (e.g., the second security mode indicates a size and/or a byte-length of the initial portion of the traffic flow that is inspected by the security device 105 that is larger than a size and/or a byte-length of an initial portion indicated by the first security mode). For example, the second security mode may indicate that offloading is enabled for all traffic flows or for traffic flows associated with a communication protocol that is included in a group of communication protocols indicated in the configuration information, among other examples) and/or a size and/or a byte-length an initial portion (e.g., 1 GB) of a traffic flow that is to be inspected by the security device 105 based on performing offloading for the traffic flow.

In some implementations, the third security mode may be a restricted security mode. For example, the third security mode may indicate that offloading is disabled for all traffic flows or for all traffic flows other than traffic flows associated with a particular communication protocol (e.g., for all traffic flows other than traffic flows associated with Hyper Text Transfer Protocol (HTTP)), among other examples.

Figure 1D:
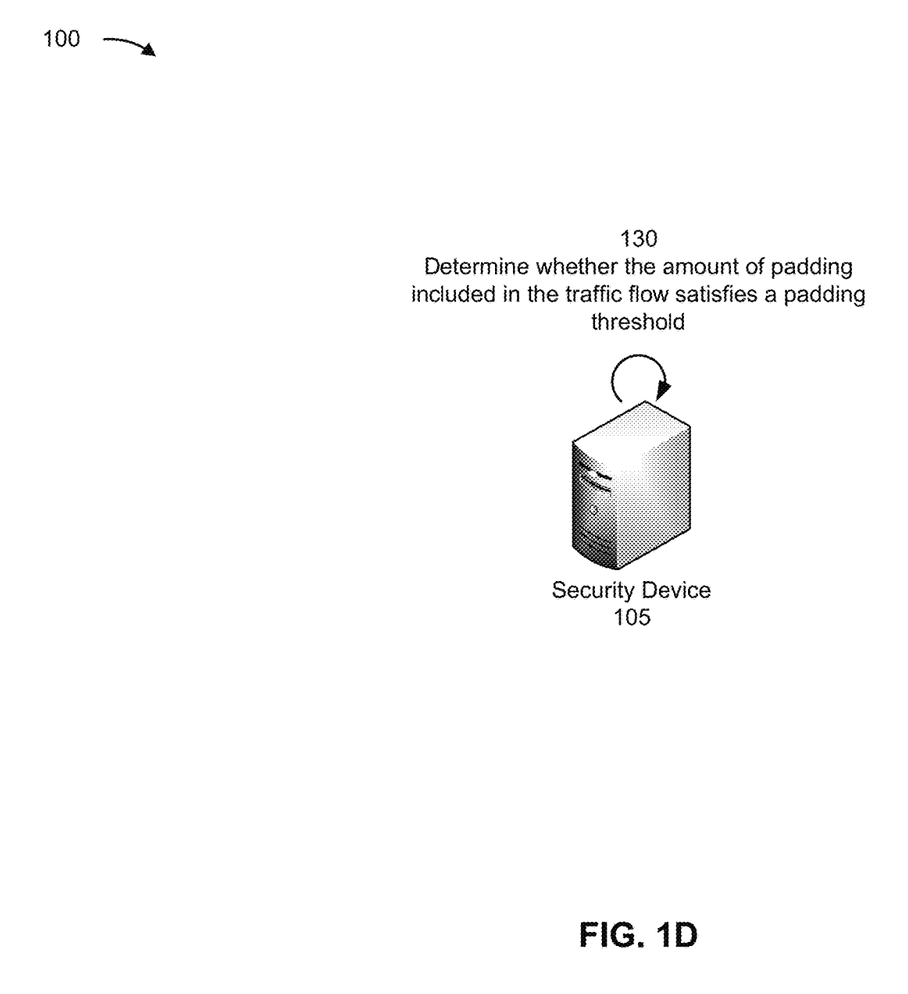

As shown in FIG. 1D, and by reference number 130, the security device 105 may determine whether the amount of the padding satisfies a padding threshold. For example, the security device 105 may determine whether the amount of padding is less than a size and/or a byte-length of an initial portion of the traffic flow to be inspected by the security device 105 when performing offloading for the traffic flow, 4 KB, 6 KB, or 8 KB, among other examples.

Figure 1E:
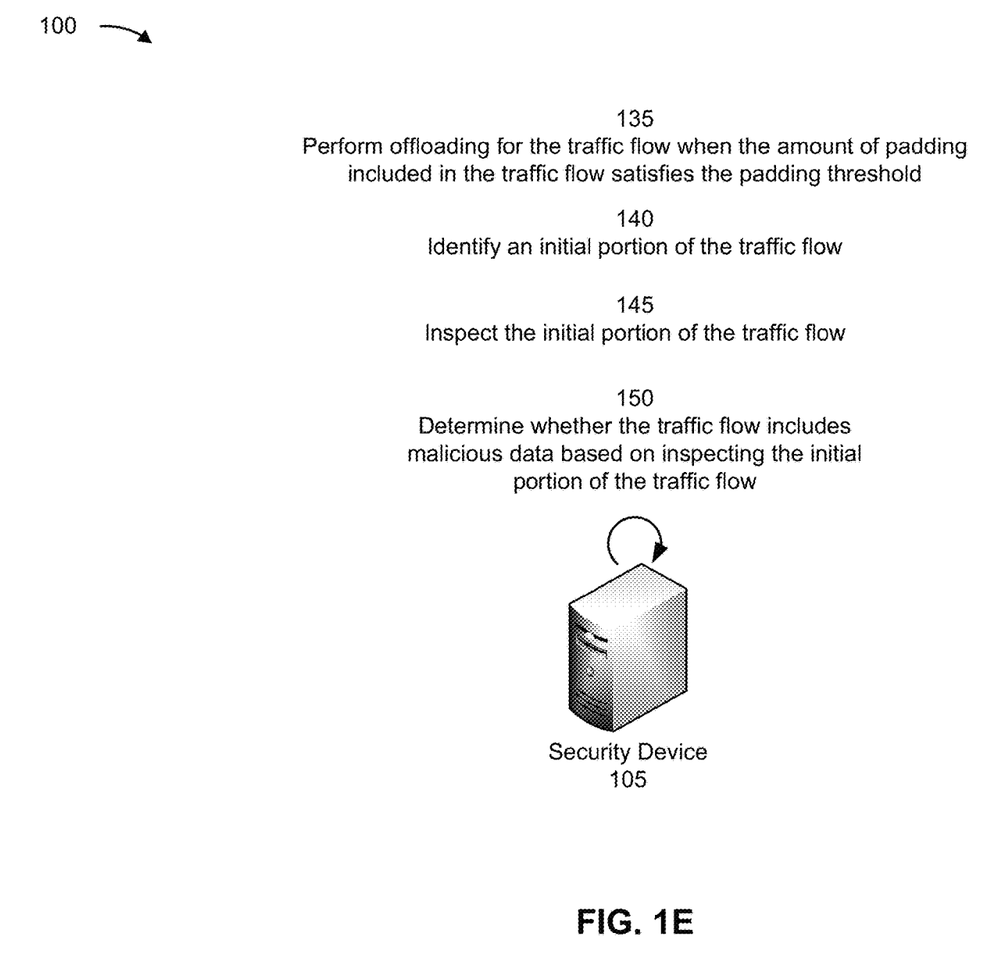

In some implementations, the amount of the padding may satisfy the padding threshold. As shown in FIG. 1E, and by reference number 135, the security device 105 may perform offloading for the traffic flow when the amount of padding satisfies the threshold.

As shown by reference number 140, the security device 105 may identify an initial portion of the traffic flow. In some implementations, a size or byte-length of the initial portion of the traffic flow may be indicated in the configuration information received by the security device 105. For example, the configuration may indicate that the size or byte-length of the initial portion of the traffic flow is 200 KB, 250 KB, 500 KB, or 1 GB of data, among other examples.

Alternatively, and/or additionally, the size or byte-length of the initial portion of the traffic flow may be pre-configured. For example, the security device 105 may receive information indicating the size or byte-length of the initial portion of the traffic flow from another security device, a device included in the network protected by the security device 105, or a user (e.g., from a user interface via which the user input information indicating the size or byte-length of the initial portion of the traffic flow).

As shown by reference numbers 145 and 150, the security device 105 may inspect the initial portion of the traffic flow and may determine whether the traffic flow is associated with malicious data based on inspecting the initial portion of the traffic flow. In some implementations, the security device 105 may include a firewall device. The firewall device may implement a firewall to inspect traffic being transmitted to and/or from a device outside of the network protected by the security device 105. The firewall may inspect the initial portion of the traffic flow based on performing one or more firewall actions on the initial portion of the traffic flow and/or applying one or more other security actions to the initial portion of the traffic flow to determine whether the traffic flow is associated with malicious data.

In some implementations, the security device 105 may include an IDS. The security device 105 may utilize the IDS to inspect the initial portion of the traffic flow based on the traffic flow being a traffic flow that is communicated within the network protected by the security device 105. The security device 105 may determine whether the initial portion of the traffic flow is associated with a suspicious pattern of behavior based on utilizing the IDS to inspect the initial portion of the traffic flow. The security device 105 may determine that the traffic flow is associated with malicious data when the initial portion of the traffic flow is associated with a suspicious pattern of behavior.

In some implementations, the security device 105 may include an IPS. The security device 105 may utilize the IPS to inspect the initial portion of the traffic flow as the traffic flow is communicated within the network protected by the security device 105. The security device 105 may determine whether the traffic flow is associated with a suspicious pattern of behavior based on utilizing the IPS to inspect the initial portion of the traffic flow. The security device 105 may determine that the traffic flow is associated with malicious data when the initial portion of the traffic flow is associated with a suspicious pattern of behavior.

In some implementations, the security device 105 may perform one or more actions based on determining that the traffic flow is associated with the malicious data. For example, the security device 105 may perform one or more actions to prevent or block a device associated with the traffic flow from accessing the network, terminate a communication session associated with the traffic flow, terminate or suspend authentication credentials associated with the device, and/or provide a notification identifying the device, a user associated with the device, and/or information indicating that the device is blocked or prevented from accessing the network (e.g., a user device associated with a network administrator), among other examples.

In some implementations, the security device 105 may determine that the traffic flow is not associated with malicious data based on inspecting the initial portion of the traffic flow. The security device 105 may not inspect a remaining portion of the traffic flow based on performing the offloading for the traffic flow. For example, the security device 105 may cause the remaining portion of the traffic flow bypass an inspection pipeline of the security device 105 (e.g., to be transmitted through the security device 105 without being processed by a set of one or more components configured to inspect traffic to determine whether the traffic is associated with malicious data).

Figure 1F:
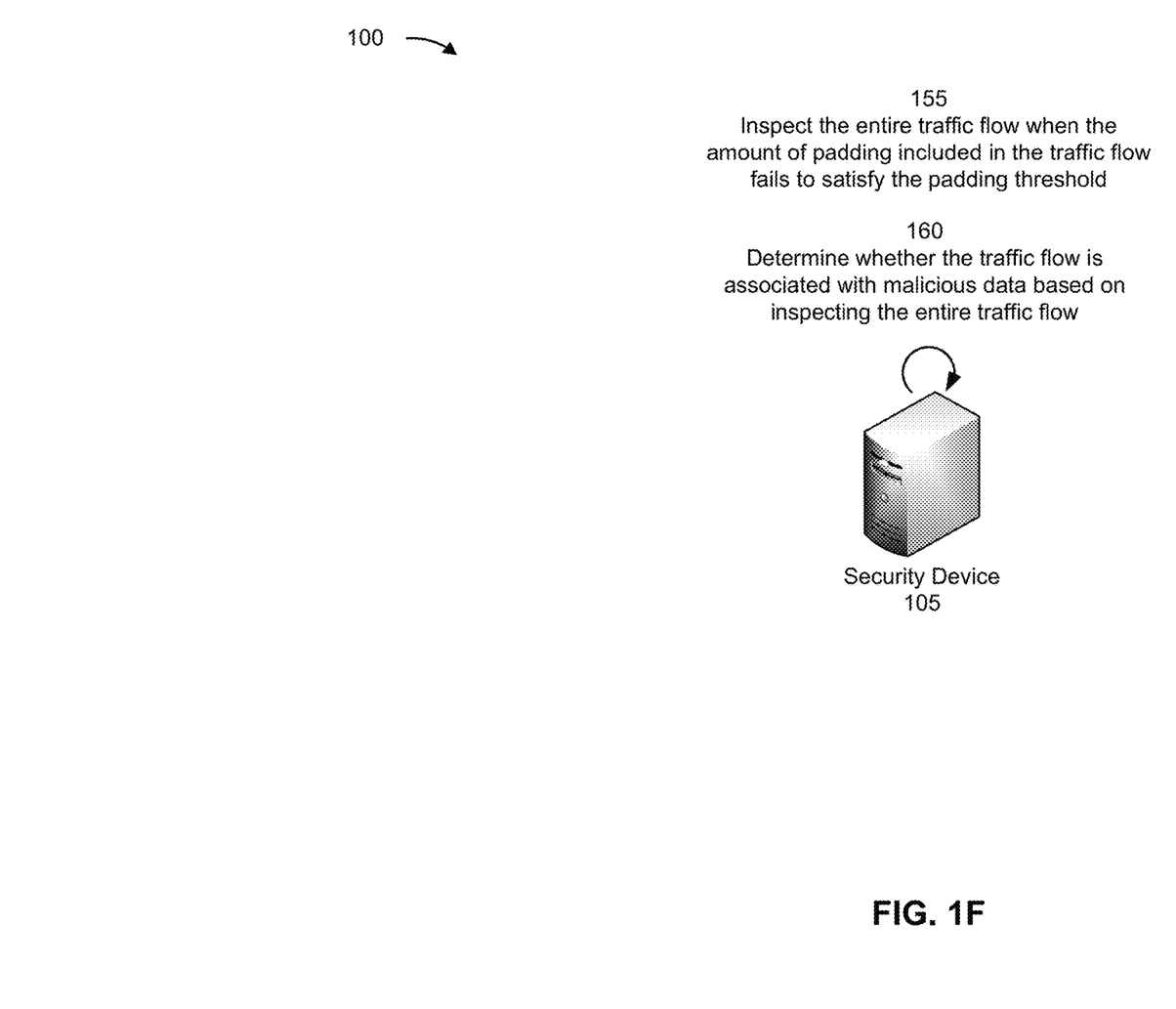

In some implementations, the amount of padding may fail to satisfy the padding threshold. As shown in FIG. 1F, and by reference numbers 155 and 160, the security device 105 may inspect, based on the amount of padding failing to satisfy the padding threshold, the entire traffic flow and may determine whether the traffic flow is associated with malicious data based on inspecting the entire traffic flow. In some implementations, the security device 105 may inspect the entire traffic flow and may determine whether the traffic flow is associated with malicious data in a manner similar to that described elsewhere herein. For example, the security device 105 may inspect the entire traffic flow and may determine whether the traffic flow is associated with malicious data in a manner similar to that described above with respect to FIG. 1E.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
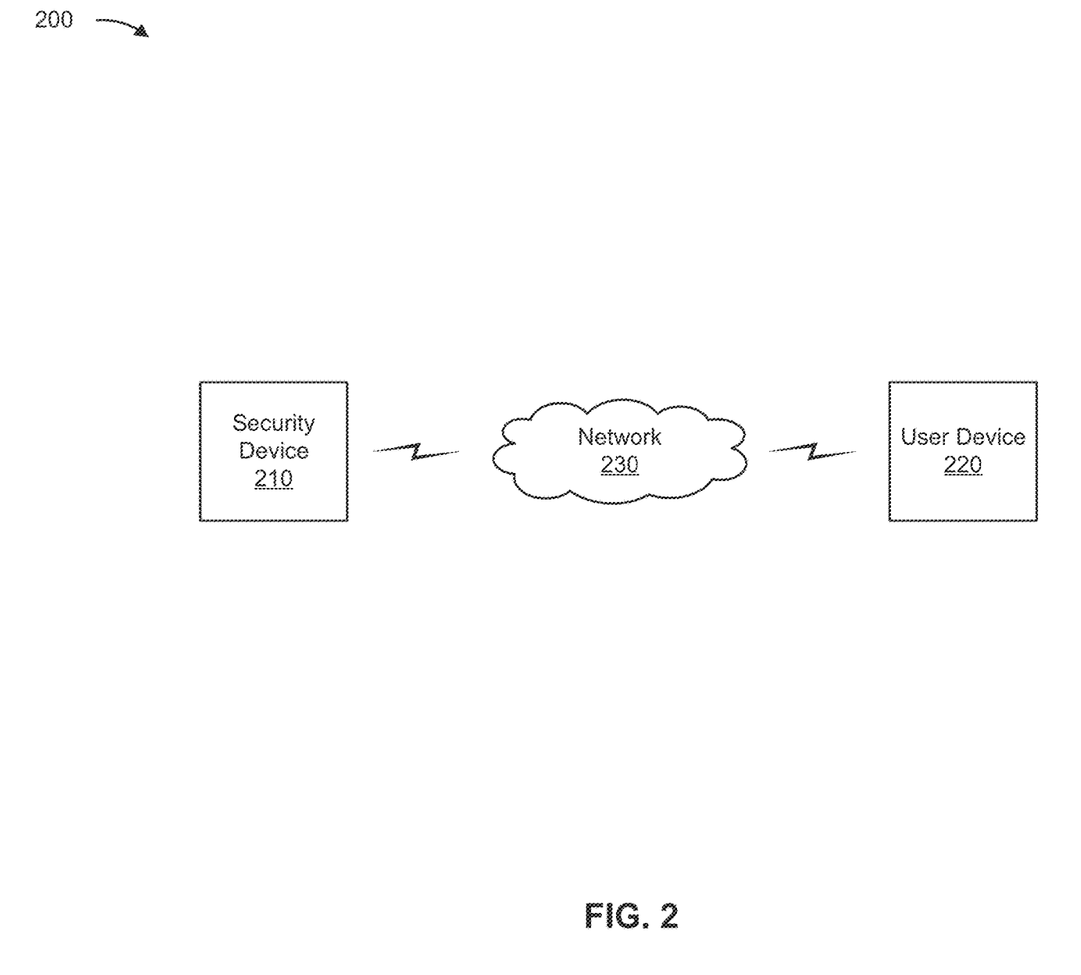
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a security device 210, a user device 220, and a network 230. Devices of environment 200 may interconnect via wired connections, wireless connections, or a combination of wired and wireless connections.

The security device 210 includes one or more devices capable of receiving, generating, storing, processing, and/or providing information associated with avoiding performing offloading for traffic flows containing malicious data, as described elsewhere herein. Additionally, or alternatively, the security device 210 may include one or more devices capable of providing a security service (e.g., a next-generation firewall service, a unified threat management service, or an advanced threat protection service, among other examples). For example, the security device 210 may include a firewall, a router, a gateway, a switch, a hub, a bridge, a reverse proxy, a server (e.g., a proxy server), an IDS, an IPS, a load balancer, two or more distributed devices, and/or a virtual machine of a cloud computing environment, among other examples.

The user device 220 includes one or more devices capable of receiving, generating, storing, processing, and/or providing information associated with avoiding performing offloading for traffic flows containing malicious data, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
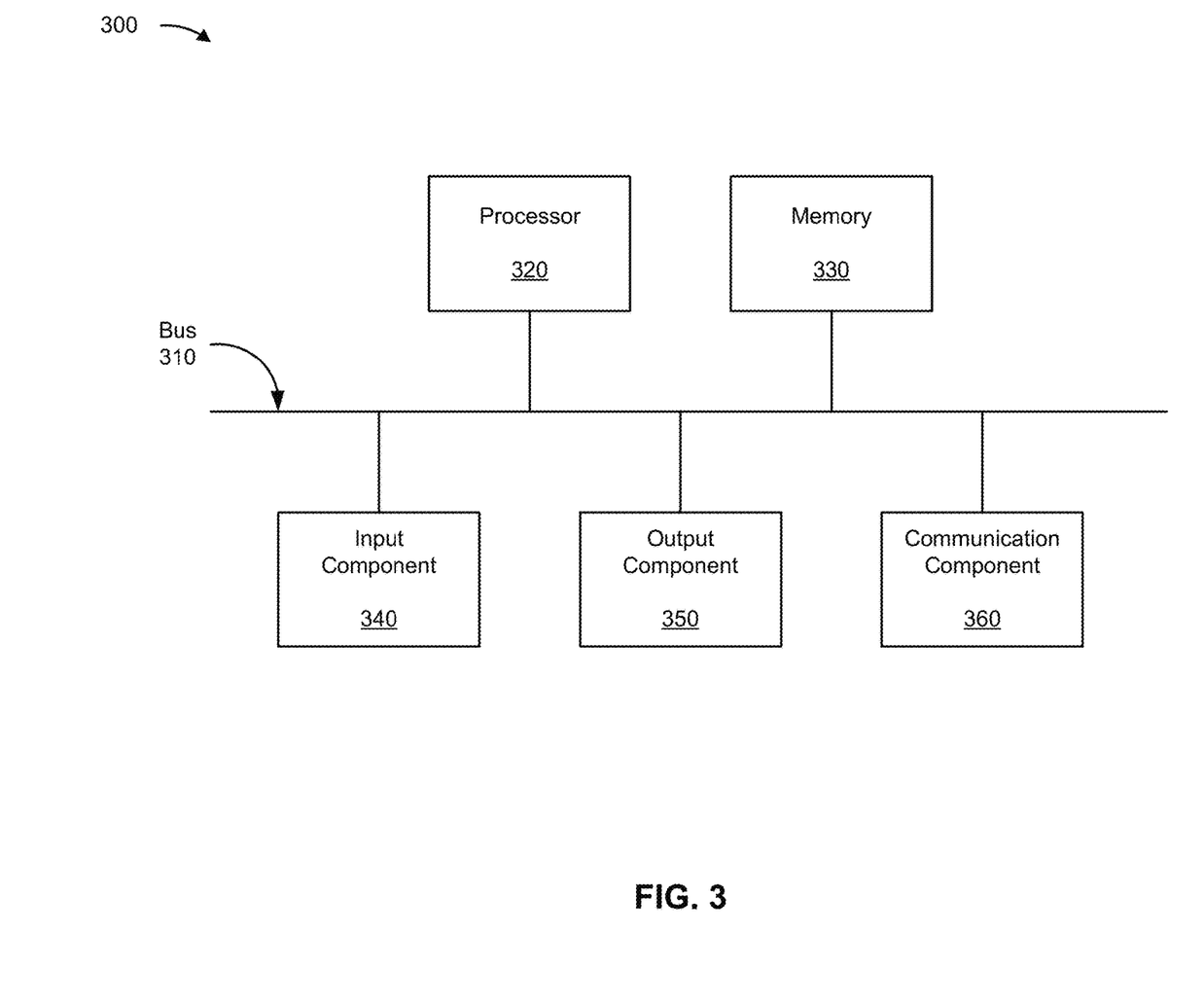
FIG. 3 is a diagram of example components of one or more devices of FIG. 2.

FIG. 3 is a diagram of example components of a device 300, which may correspond to the security device 210 and/or the user device 220. In some implementations, the security device 210 and/or the user device 220 include one or more devices 300 and/or one or more components of device 300. As shown in FIG. 3, device 300 may include a bus 310, a processor 320, a memory 330, an input component 340, an output component 350, and a communication component 360.

The bus 310 includes one or more components that enable wired and/or wireless communication among the components of device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). Memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables device 300 to provide output, such as via a display, a speaker, and/or a light-emitting diode. The communication component 360 enables device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry is used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
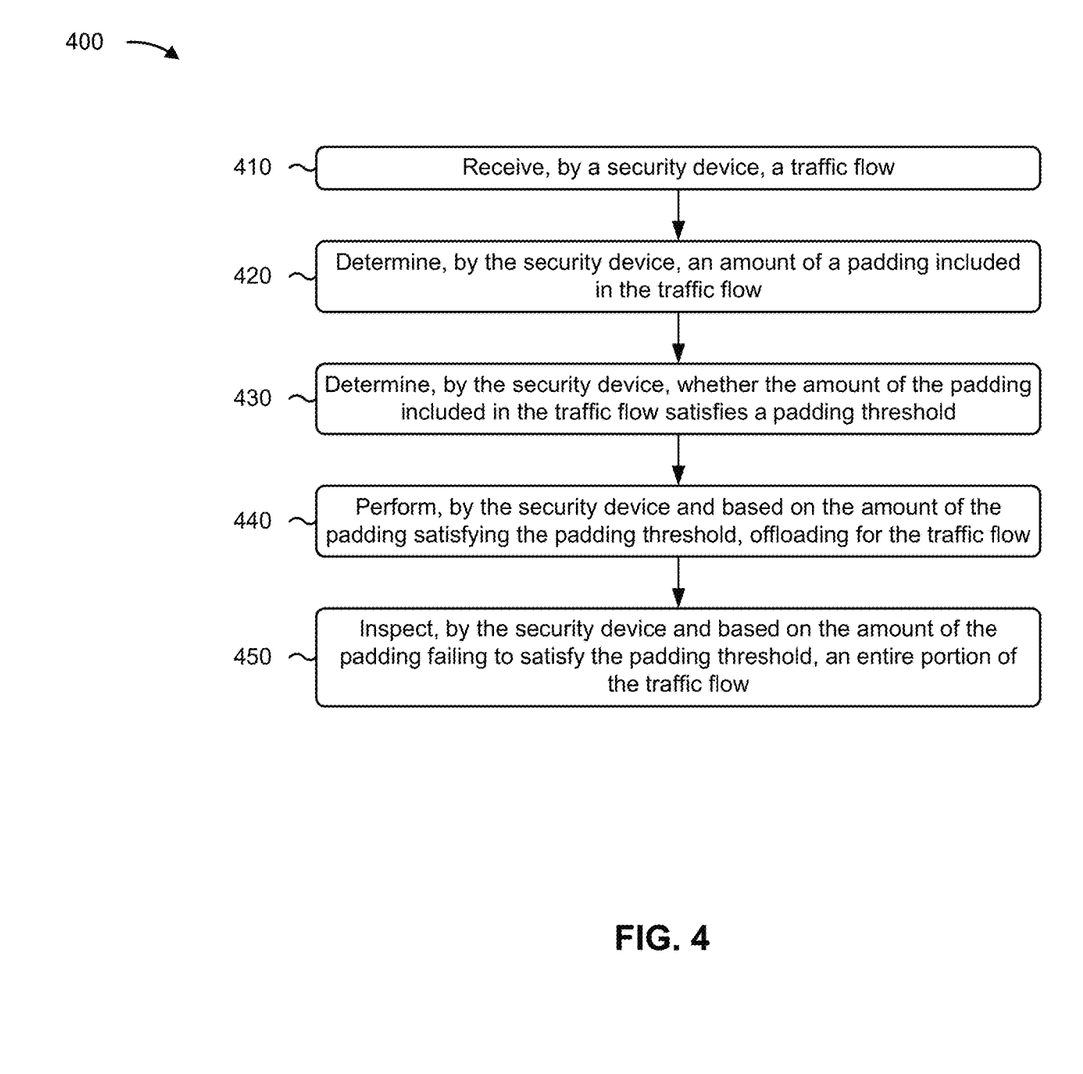
FIG. 4 is a flowchart of an example process relating to avoiding offloading traffic flows associated with malicious data.

FIG. 4 is a flowchart of an example process 400 associated with systems and methods for avoiding offloading traffic flows associated with malicious data. In some implementations, one or more process blocks of FIG. 4 are performed by a security device (e.g., security device 105). In some implementations, one or more process blocks of FIG. 4 are performed by another device or a group of devices separate from or including the security device, such as a user device (e.g., user device 220). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a traffic flow (block 410). For example, the security device may receive a traffic flow, as described above.

As further shown in FIG. 4, process 400 may include determining an amount of a padding included in the traffic flow (block 420). For example, the security device may determine an amount of a padding included in the traffic flow, as described above.

As further shown in FIG. 4, process 400 may include determining whether the amount of the padding included in the traffic flow satisfies a padding threshold (block 430). For example, the security device may determine whether the amount of the padding included in the traffic flow satisfies a padding threshold, as described above.

As further shown in FIG. 4, process 400 may include performing, based on the amount of the padding satisfying the padding threshold, offloading for the traffic flow (block 440). For example, the security device may perform, based on the amount of the padding satisfying the padding threshold, offloading for the traffic flow, as described above.

As further shown in FIG. 4, process 400 may include inspecting, based on the amount of the padding failing to satisfy the padding threshold, an entire portion of the traffic flow (block 450). For example, the security device may inspect, based on the amount of the padding failing to satisfy the padding threshold, an entire portion of the traffic flow, as described above.

Process 400 may include additional implementations, such as any single implementation or any combination of implementations described below and/or in connection with one or more other processes described elsewhere herein.

In a first implementation, the amount of the padding satisfies the padding threshold, and wherein performing the offloading for the traffic flow comprises identifying an initial portion of the traffic flow that includes an amount of data satisfying a data threshold, wherein the initial portion of the traffic flow includes the padding, and wherein the amount of the padding is not included in the amount of data, and inspecting the initial portion of the traffic flow, wherein a remaining portion of the traffic flow is not inspected by the security device.

In a second implementation, alone or in combination with the first implementation, inspecting the initial portion of the traffic flow comprises performing a deep packet inspection on the initial portion of the traffic flow.

In a third implementation, alone or in combination with one or more of the first and second implementations, the amount of the padding fails to satisfy the padding threshold, and wherein inspecting the entire portion of the traffic flow comprises marking the traffic flow as a high-risk traffic flow based on the amount of the padding failing to satisfy the padding threshold, and inspecting the entire portion of the traffic flow based on the traffic flow being marked as the high-risk traffic flow.

In a fourth implementation, alone or in combination with one or more of the first through third implementations, determining the amount of the padding comprises determining an amount of sequential padding included in the traffic flow.

In a fifth implementation, alone or in combination with one or more of the first through fourth implementations, process 400 includes receiving a configuration indicating a security mode associated with performing offloading, wherein the security mode comprises a first security mode, wherein the padding threshold comprises a first threshold when the configuration indicates that the security mode comprises the first security mode, a second security mode, wherein the padding threshold comprises a second threshold when the configuration indicates that the security mode comprises the second security mode, wherein the second threshold is different from the first threshold, or a third security mode, wherein the offloading is not performed for the traffic flow and the entire portion of the traffic flow is inspected based on the amount of the padding satisfying the padding threshold and the configuration indicating that the security mode comprises the third security mode.

In a sixth implementation, alone or in combination with one or more of the first through fifth implementations, process 400 includes receiving a configuration indicating one or more of the padding threshold or an amount of data to be included in an initial portion of the traffic flow, and wherein performing the offloading for the traffic flow includes inspecting only the initial portion of the traffic flow.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a security device, a traffic flow;
   determining, by the security device, an amount of a padding included in the traffic flow,
      wherein the padding comprises a repeated set of characters;
   determining, by the security device, whether the amount of the padding included in the traffic flow satisfies a padding threshold; and
   selectively performing, by the security device, offloading for the traffic flow or inspecting an entire portion of the traffic flow based on whether the amount of the padding satisfies or fails to satisfy the padding threshold,
      wherein the offloading for the traffic flow is performed for the traffic flow if the amount of the padding satisfies the padding threshold, and
      wherein the entire portion of the traffic flow is inspected if the amount of the padding fails to satisfy the padding threshold.

2. The method of claim 1, wherein the amount of the padding satisfies the padding threshold, and wherein performing the offloading for the traffic flow comprises:
   identifying an initial portion of the traffic flow that includes an amount of data satisfying a data threshold,
      wherein the initial portion of the traffic flow includes the padding, and
      wherein the amount of the padding is not included in the amount of data; and inspecting the initial portion of the traffic flow,
      wherein a remaining portion of the traffic flow is not inspected by the security device.

3. The method of claim 2, wherein inspecting the initial portion of the traffic flow comprises:
   performing a deep packet inspection on the initial portion of the traffic flow.

4. The method of claim 1, wherein the amount of the padding fails to satisfy the padding threshold, and wherein inspecting the entire portion of the traffic flow comprises:
   marking the traffic flow as a high-risk traffic flow based on the amount of the padding failing to satisfy the padding threshold; and
   inspecting the entire portion of the traffic flow based on the traffic flow being marked as the high-risk traffic flow.

5. The method of claim 1, wherein determining the amount of the padding comprises:
   determining an amount of sequential padding included in the traffic flow.

6. The method of claim 1, further comprising:
   receiving a configuration indicating a security mode associated with performing offloading, wherein the security mode comprises:
      a first security mode, wherein the padding threshold comprises a first threshold when the configuration indicates that the security mode comprises the first security mode,
      a second security mode, wherein the padding threshold comprises a second threshold when the configuration indicates that the security mode comprises the second security mode, wherein the second threshold is different from the first threshold, or
      a third security mode, wherein the offloading is not performed for the traffic flow and the entire portion of the traffic flow is inspected based on the amount of the padding satisfying the padding threshold and the configuration indicating that the security mode comprises the third security mode.

7. The method of claim 1, further comprising:
   receiving a configuration indicating one or more of the padding threshold or an amount of data to be included in an initial portion of the traffic flow; and
   wherein performing the offloading for the traffic flow includes inspecting only the initial portion of the traffic flow.

8. A non-transitory computer-readable medium storing a set of instructions, the set of instructions comprising:
   one or more instructions that, when executed by one or more processors of a security device, cause the security device to:
      receive a traffic flow;
      determine an amount of a padding included in the traffic flow,
         wherein the padding comprises a repeated set of characters;
      determine whether the amount of the padding included in the traffic flow satisfies a padding threshold; and
      selectively perform offloading for the traffic flow or inspect an entire portion of the traffic flow based on whether the amount of the padding satisfies or fails to satisfy the padding threshold,
         wherein the offloading for the traffic flow is performed for the traffic flow if the amount of the padding satisfies the padding threshold, and
         wherein the entire portion of the traffic flow is inspected if the amount of padding fails to satisfy the padding threshold.

9. The non-transitory computer-readable medium of claim 8, wherein the amount of the padding satisfies the padding threshold, and wherein the one or more instructions, that cause the security device to perform the offloading for the traffic flow, cause the security device to:
   identify an initial portion of the traffic flow that includes an amount of data satisfying a data threshold,
      wherein the initial portion of the traffic flow includes the padding, and
      wherein the amount of the padding is not included in the amount of data; and inspect the initial portion of the traffic flow,
      wherein a remaining portion of the traffic flow is not inspected by the security device.

10. The non-transitory computer-readable medium of claim 9, wherein the one or more instructions, that cause the security device to inspect the initial portion of the traffic flow, cause the security device to:
    perform a deep packet inspection on the initial portion of the traffic flow.

11. The non-transitory computer-readable medium of claim 8, wherein the amount of the padding fails to satisfy the padding threshold, and wherein the one or more instructions, that cause the security device to inspect the entire portion of the traffic flow, cause the security device to:
mark the traffic flow as a high-risk traffic flow based on the amount of the padding failing to satisfy the padding threshold; and
inspect the entire portion of the traffic flow based on the traffic flow being marked as the high-risk traffic flow.

12. The non-transitory computer-readable medium of claim 8, wherein the one or more instructions, that cause the security device to determine the amount of the padding, cause the security device to:
determine an amount of sequential padding included in the traffic flow.

13. The non-transitory computer-readable medium of claim 8, wherein the one or more instructions further cause the security device to:
receive a configuration indicating a security mode associated with performing offloading, wherein the security mode comprises:
a first security mode, wherein the padding threshold comprises a first threshold when the configuration indicates that the security mode comprises the first security mode,
a second security mode, wherein the padding threshold comprises a second threshold when the configuration indicates that the security mode comprises the second security mode, wherein the second threshold is different from the first threshold, or
a third security mode, wherein the offloading is not performed for the traffic flow and the entire portion of the traffic flow is inspected based on the amount of the padding satisfying the padding threshold and the configuration indicating that the security mode comprises the third security mode.

14. The non-transitory computer-readable medium of claim 8, wherein the one or more instructions further cause the security device to:
receive a configuration indicating one or more of the padding threshold or an amount of data to be included in an initial portion of the traffic flow; and
wherein the one or more instructions, that cause the security device to perform the offloading for the traffic flow, cause the security device to inspect only the initial portion of the traffic flow.

15. A security device, comprising:
one or more memories; and
one or more processors to:
receive a traffic flow;
determine an amount of a padding included in the traffic flow,
wherein the padding comprises a repeated set of characters;
determine whether the amount of the padding included in the traffic flow satisfies a padding threshold; and
selectively perform offloading for the traffic flow or inspect an entire portion of the traffic flow based on whether the amount of the padding satisfies or fails to satisfy the padding threshold,
wherein the offloading for the traffic flow is performed for the traffic flow if the amount of the padding satisfies the padding threshold, and
wherein the entire portion of the traffic flow is inspected if the amount of padding fails to satisfy the padding threshold.

16. The security device of claim 15, wherein the amount of the padding satisfies the padding threshold, and wherein the one or more processors, to perform the offloading for the traffic flow, are to:
identify an initial portion of the traffic flow that includes an amount of data satisfying a data threshold,
wherein the initial portion of the traffic flow includes the padding, and
wherein the amount of the padding is not included in the amount of data; and
inspect the initial portion of the traffic flow,
wherein a remaining portion of the traffic flow is not inspected by the security device.

17. The security device of claim 16, wherein the one or more processors, to inspect the initial portion of the traffic flow, are to:
perform a deep packet inspection on the initial portion of the traffic flow.

18. The security device of claim 15, wherein the amount of the padding fails to satisfy the padding threshold, and wherein the one or more processors, to inspect the entire portion of the traffic flow, are to:
mark the traffic flow as a high-risk traffic flow based on the amount of the padding failing to satisfy the padding threshold; and
inspect the entire portion of the traffic flow based on the traffic flow being marked as the high-risk traffic flow.

19. The security device of claim 15, wherein the one or more processors are further to:
receive a configuration indicating a security mode associated with performing offloading, wherein the security mode comprises:
a first security mode, wherein the padding threshold comprises a first threshold when the configuration indicates that the security mode comprises the first security mode,
a second security mode, wherein the padding threshold comprises a second threshold when the configuration indicates that the security mode comprises the second security mode, wherein the second threshold is different from the first threshold, or
a third security mode, wherein the offloading is not performed for the traffic flow and the entire portion of the traffic flow is inspected based on the amount of the padding satisfying the padding threshold and the configuration indicating that the security mode comprises the third security mode.

20. The security device of claim 15, wherein the one or more processors are further to:
receive a configuration indicating one or more of the padding threshold or an amount of data to be included in an initial portion of the traffic flow; and
wherein the one or more processors, to perform the offloading for the traffic flow, are to inspect only the initial portion of the traffic flow.

* * * * *